United States Patent
Masarik et al.

(10) Patent No.: US 10,003,756 B2
(45) Date of Patent: Jun. 19, 2018

(54) COMBINATION VIDEO AND OPTICAL SIGHT

(71) Applicant: N2 Imaging Systems, LLC, Irvine, CA (US)

(72) Inventors: David Michael Masarik, Newport Beach, CA (US); Peter Denis Vallianos, Manhattan Beach, CA (US)

(73) Assignee: N2 Imaging Systems, LLC, Irvine, CA (US)

( * ) Notice: Subject to any disclaimer, the term of this patent is extended or adjusted under 35 U.S.C. 154(b) by 0 days. days.

(21) Appl. No.: 14/806,026

(22) Filed: Jul. 22, 2015

(65) Prior Publication Data

US 2016/0028970 A1     Jan. 28, 2016

Related U.S. Application Data

(60) Provisional application No. 62/027,697, filed on Jul. 22, 2014.

(51) Int. Cl.
*H04N 5/33*     (2006.01)
*F41G 1/38*     (2006.01)
(Continued)

(52) U.S. Cl.
CPC ............. *H04N 5/332* (2013.01); *F41G 1/36* (2013.01); *F41G 1/38* (2013.01); *G02B 23/10* (2013.01);
(Continued)

(58) Field of Classification Search
CPC .......... H04N 5/332; H04N 5/335; F41G 1/36; F41G 1/38; G02B 25/001
See application file for complete search history.

(56) References Cited

U.S. PATENT DOCUMENTS 5,035,472 A     7/1991    Hansen
5,140,151 A *    8/1992    Weiner .................. G02B 23/14
                                                                     359/226.2

(Continued)

FOREIGN PATENT DOCUMENTS

WO     WO 2016/014655      1/2016

OTHER PUBLICATIONS

PCT Application No. PCT/US2015/041517 Search Report and Written Opinion dated Jan. 6, 2016 in 11 pages.

(Continued)

*Primary Examiner* — Jason A Flohre
(74) *Attorney, Agent, or Firm* — Locke Lord LLP; Joshua L. Jones; Scott D. Wofsy

(57) ABSTRACT

A sight system is provided that includes an optical mode providing an optical image of a field of view and a video display mode providing video of the field of view acquired by an image sensor. The sight system can include optical components configured to present the field of view to the image sensor and to present substantially the field of view to a user through an eyepiece coupled to the sight system. The sight system can include a display configured to display to the user, through the eyepiece, video of the field of view acquired by the image sensor. The sight system can include a user interface feature configured to change from the optical mode to the video display mode when actuated by the user. Thus, the sight system can be configured to provide bore-sighted optical and video data to the user.

25 Claims, 17 Drawing Sheets

(51) Int. Cl.
*F41G 1/36* (2006.01)
*G02B 23/10* (2006.01)
*G02B 26/08* (2006.01)
*G02B 25/00* (2006.01)
*H04N 5/335* (2011.01)

(52) U.S. Cl.
CPC ......... *G02B 26/0816* (2013.01); *H04N 5/335* (2013.01); *G02B 25/001* (2013.01)

(56) References Cited

U.S. PATENT DOCUMENTS

| | | | |
|---|---|---|---|
| 5,463,495 A * | 10/1995 | Murg | F41G 1/38 359/399 |
| 5,653,034 A | 8/1997 | Bindon | |
| 5,903,996 A * | 5/1999 | Morley | G02B 23/12 359/353 |
| 5,946,132 A | 8/1999 | Phillips | |
| 6,020,994 A * | 2/2000 | Cook | H04N 5/2254 348/E5.028 |
| 6,807,742 B2 | 10/2004 | Schick et al. | |
| 7,069,685 B2 | 7/2006 | Houde-Walter | |
| 7,171,776 B2 | 2/2007 | Staley, III | |
| 8,082,688 B2 | 12/2011 | Elpedes et al. | |
| 8,336,776 B2 | 12/2012 | Horvath et al. | |
| 2004/0031184 A1 | 2/2004 | Hope | |
| 2004/0050240 A1 * | 3/2004 | Greene | F41G 3/06 89/41.06 |
| 2005/0018041 A1 | 1/2005 | Towery et al. | |
| 2005/0198885 A1 * | 9/2005 | Staley, III | F41G 1/52 42/142 |
| 2005/0268519 A1 * | 12/2005 | Pikielny | F41G 11/003 42/124 |
| 2006/0137235 A1 | 6/2006 | Florence et al. | |
| 2006/0164718 A1 | 7/2006 | Tai | |
| 2006/0230665 A1 * | 10/2006 | Narcy | G02B 23/12 42/123 |
| 2007/0035824 A1 * | 2/2007 | Scholz | F41G 1/38 359/399 |
| 2009/0141365 A1 * | 6/2009 | Jannard | G02B 3/14 359/666 |
| 2010/0175298 A1 * | 7/2010 | Thomas | F41G 1/18 42/122 |
| 2011/0041377 A1 | 2/2011 | Thomas et al. | |
| 2011/0067288 A1 | 3/2011 | Hakansson et al. | |
| 2012/0030985 A1 * | 2/2012 | Mauricio | F41G 1/38 42/84 |
| 2012/0033195 A1 | 2/2012 | Tai | |
| 2012/0097741 A1 * | 4/2012 | Karcher | F41G 1/38 235/404 |
| 2012/0106170 A1 | 5/2012 | Matthews et al. | |
| 2012/0182417 A1 * | 7/2012 | Everett | F41G 1/30 348/135 |
| 2014/0047754 A1 * | 2/2014 | Compton | F41C 27/00 42/84 |
| 2014/0110482 A1 * | 4/2014 | Bay | F41G 1/38 235/404 |

OTHER PUBLICATIONS

Extended European Search Report dated Mar. 2, 2018 issued during the prosecution of European Patent Application No. 15825069.6 (5 pages).

* cited by examiner

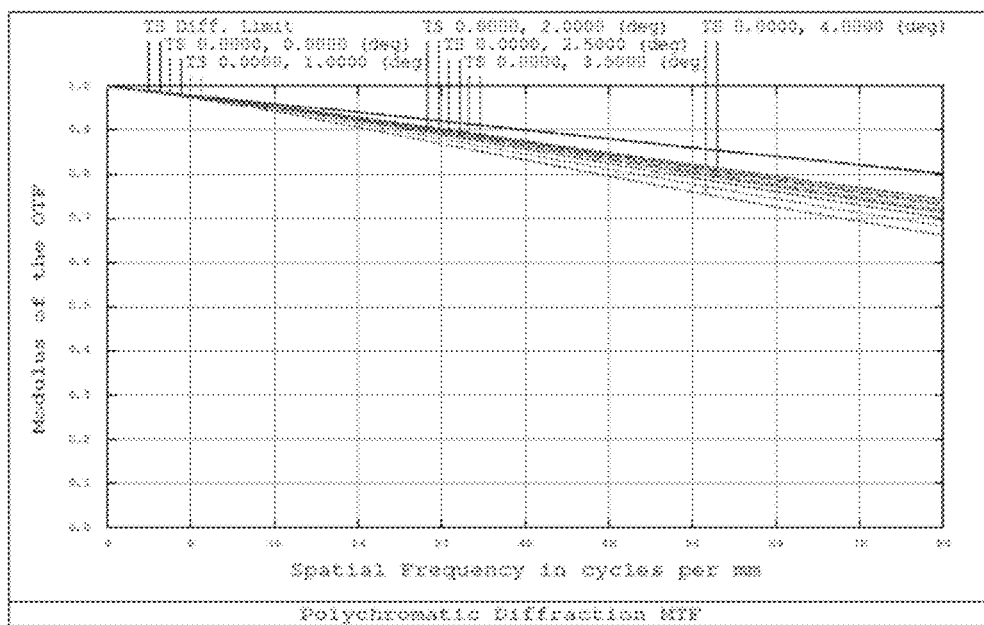
FIG. 8
FIG. 9
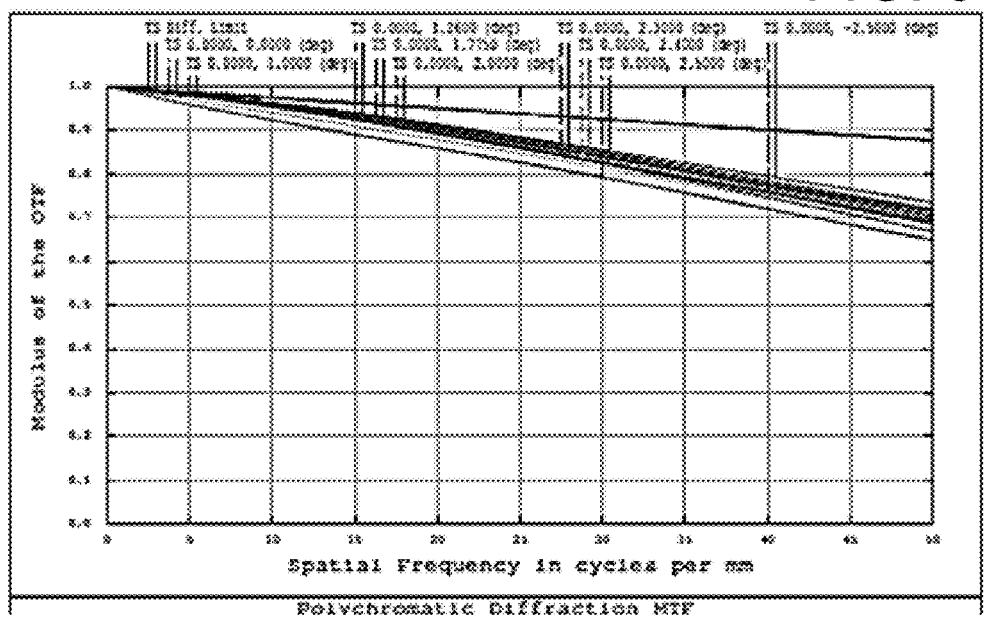

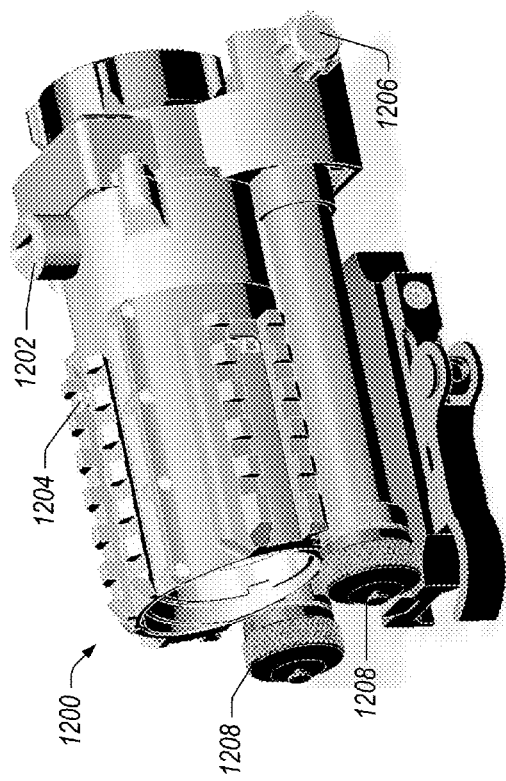
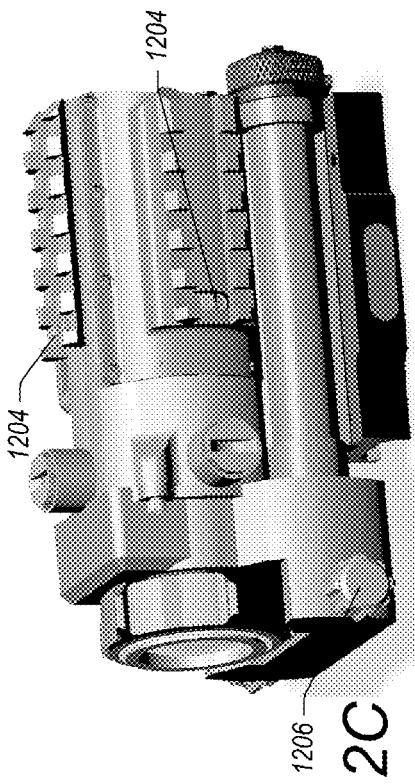
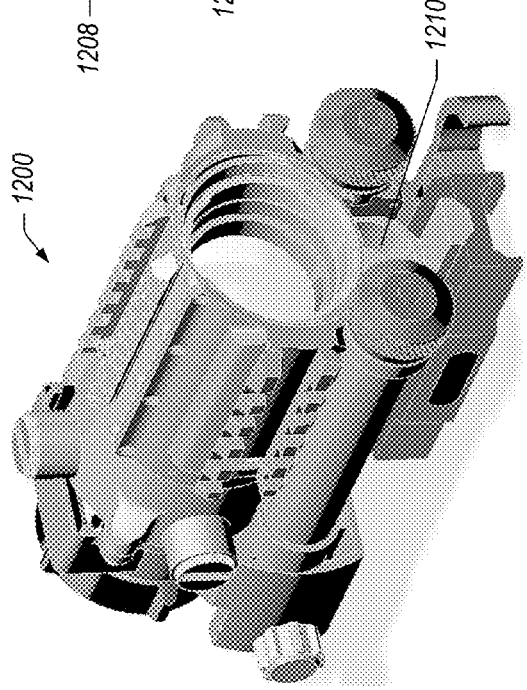
FIG. 12A
FIG. 12B
FIG. 12C

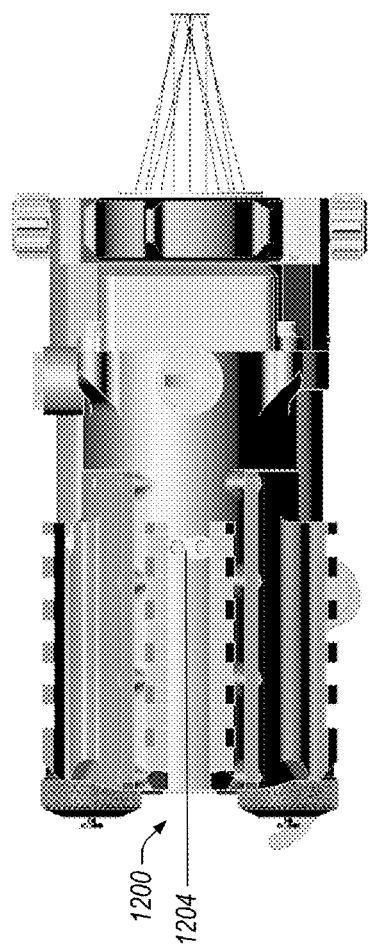
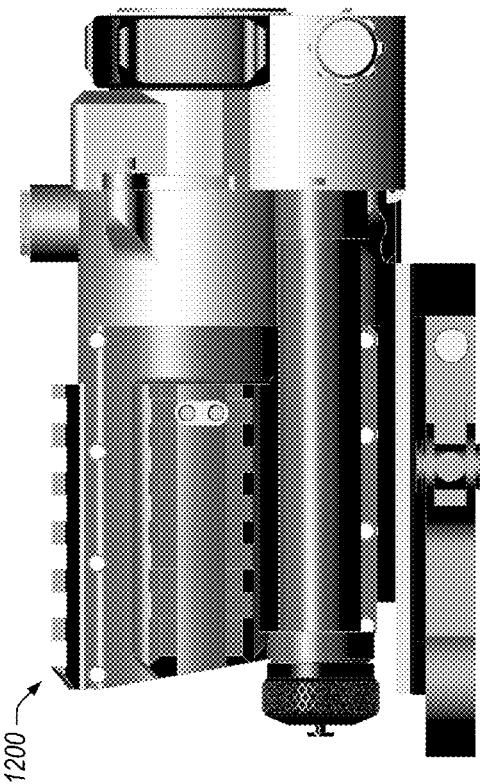
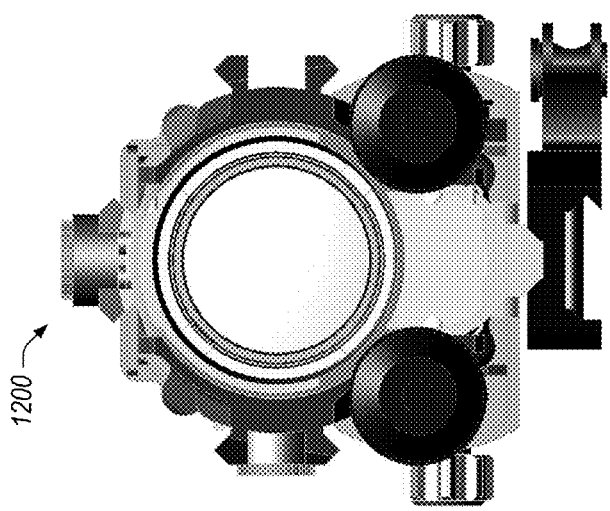
FIG. 12D
FIG. 12F
FIG. 12E

COMBINATION VIDEO AND OPTICAL SIGHT

CROSS-REFERENCE TO RELATED APPLICATIONS

This application claims the benefit of priority to U.S. Prov. App'n No. 62/027,697, filed Jul. 22, 2014, entitled "Combination video and optical sight," which is incorporated by reference herein in its entirety.

BACKGROUND

Field

The present disclosure generally relates to sight systems, and particularly to sight systems for guns.

Description of Related Art

Sight systems can be used to aid a user of a gun to locate and aim at a desired target. Sight systems can be attached to the gun to provide visual feedback to the user about a field of view down range of the gun. Sight systems can include reticles and other features to aid in adjusting an aiming point so that the gun will hit the targeted object. To improve the visual feedback, sight systems can present magnified views of the field of view located down range of the gun so as to allow the user to resolve greater detail and fine-tune the aiming point of the gun.

SUMMARY

The systems, methods and devices of the disclosure each have innovative aspects, no single one of which is indispensable or solely responsible for the desirable attributes disclosed herein. Without limiting the scope of the claims, some of the advantageous features will now be summarized.

Some embodiments provide for a sight system that includes an optical mode providing an optical image of a field of view and a video display mode providing video of the field of view acquired by an image sensor. The image sensor can be adapted to detect low light levels and/or infrared radiation. The sight system can include optical components configured to present the field of view to the image sensor and to present substantially the field of view to a user through an eyepiece coupled to the sight system. The sight system can include a display configured to display to the user, through the eyepiece, video of the field of view acquired by the image sensor. The sight system can include a user interface feature configured to change from the optical mode to the video display mode when actuated by the user. Thus, the sight system can be configured to provide bore-sighted optical and video data to the user.

In some embodiments, the image sensor can be configured to be sensitive to low light levels and to short wave infrared radiation. The sight system can be used to provide video imagery from the image sensor that can combine acquired visible and infrared radiation data to increase or enhance displayed contrast between objects. The sight system can provide visual information to the user that increases or enhances contrast during a thermal transition in a diurnal cycle by combining information from the visible radiation and infrared radiation. Thus, the sight system can provide to a user bore-sighted optical images, low light level video, and infrared video.

In some embodiments, the sight system can include modular capabilities such that additional components can be attached to the sight system without obstructing the field of view of the sight system. In some embodiments, the sight system can include a radio frequency transceiver configured to transmit information from the sight system and/or modules coupled to the sight system to devices over a short range. In some embodiments, the sight system provides a magnified image of the field of view to the user. In some embodiments, the sight system includes integrated sensors such as a tilt or inertial sensor. In some embodiments, the sight system can present a reticle to the user. In some embodiments, the sight system can present a reticle with a ballistics-compensated indicator. The ballistics-compensated indicator can be based at least in part on information from integrated sensors in the sight system and a laser range finder coupled to the sight system.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

FIG. 8 is a plot of imaging performance at a reticle of a sight system according to some embodiments.

FIG. 9 is a plot indicating resolution performance through a relay optic chain to an imaging sensor of a sight system according to some embodiments.

FIGS. 12A-12J illustrate various views of a sight system that includes a bore-sighted direct view mode and a bore-sighted video view mode.

DETAILED DESCRIPTION

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential.

Sight Systems Overview

Figure 1:
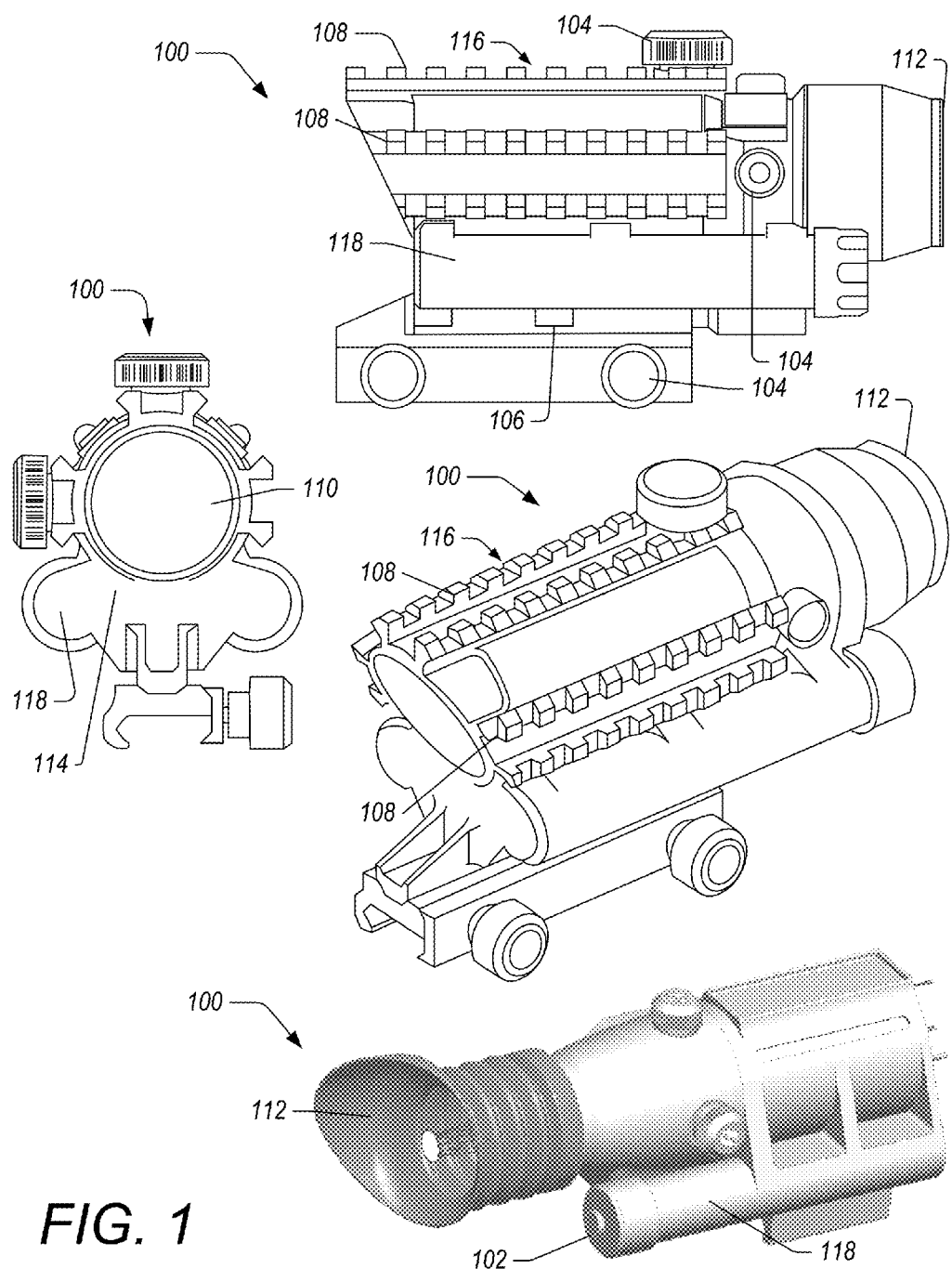
FIG. 1 illustrates example embodiments of a sight system that includes a bore-sighted direct view mode and a bore-sighted video view mode.

FIG. 1 illustrates example embodiments of a sight system 100 that includes a bore-sighted direct-view mode and a bore-sighted video view mode. The sight system 100 can include a housing 102 configured to house internal optical components, an image sensor, a display, a power source, controls, and the like. The housing 102 can be configured to be structurally rigid and durable and lightweight, using, for example, metals such as aluminum, plastics, a combination of these or other similar materials. The housing 102 can include controls 104 for a user to adjust how the sight system 100 functions. For example, the controls 104 can include a diopter adjustment, a reticle adjustment, a mode-switching control, focus controls, zoom controls, power controls, and the like. The housing 102 can include mounting rails 106 that allows the sight system 100 to be mounted to a rail of a gun or other device. The mounting rails 106 can be configured to mate with different rail types including, for example, Picatinny rails, Weaver rails, and the like.

The 102 housing can include module rails 108 integrated into the housing for mounting, powering, and connecting to modular add-on components which can be bore-sighted such as, for example, a laser range finder ("LRF"), a thermal imager with close combat or longer range optic, an ultraviolet ("UV") or short-wave infrared ("SWIR") imager, a UV or SWIR pointer or illuminator, or the like. The module rails 108 can be configured to be compatible with modules having Picatinny rails, Weaver rails, or the like. The module rails 108 can be configured to provide power to modules connected thereto through inductive means or through electrical contacts. The module rails 108 can be configured to transmit data between modules attached thereto or to send or receive data from attached modules. As described herein, the mount rails 106 or module rails 108 can include data and/or power contacts that provide electrical coupling, optical coupling, or both between the sight system 100, attached modules, and/or the system to which the sight system 100 is mounted. For example, the rails 106 or 108 can include fiber optic non-contact optical connectors to optically couple optical signals between a module and the sight system 100, between a module and another module, between a module and the device to which the sight system 100 is mounted, or between the sight system 100 and the device to which it is mounted. The module rails 108 can be integrated (e.g., cast or machined into) the housing 102 which can result in suitable alignment between the optical connectors and corresponding optical connectors on attached modules.

The sight system 100 can include a front end optical system 110 configured to provide an image of a field of view. The field of view can be at least about 2° and less than or equal to about 20°, at least about 4° and less than or equal to about 15°, at least about 6° and less than or equal to about 10°, at least about 7° and less than or equal to about 9°. The front end optical system 110 can include a reticle at a real image plane of the optical system. The front end optical system can be configured to provide a magnified image of the field of view where the magnification is at least about 1× and less than or equal to about 25×, at least about 2× and less than or equal to about 10×, at least about 3× and less than or equal to about 5×.

The sight system 100 can include an eyepiece 112 configured to provide to a user a direct-view capability where the user sees the optical image of the field of view of the front end optical system 110. The eyepiece 112 can have a field of view that is at least about 15° and less than or equal to about 40°, at least about 20° and less than or equal to about 35°, at least about 30° and less than or equal to about 34°.

The sight system can include an image sensor 114 situated within the housing 102. The image sensor 114 can be any suitable image sensor capable of converting electromagnetic radiation to electrical data. For example, the image sensor 114 can be a focal plane array, such as a CMOS image sensor, a CCD, or the like. The image sensor 114 can be a relatively high resolution (e.g., about 1 megapixel, about 2 megapixels, about 5 megapixels, or greater than about 5 megapixels), electronic-zoom-capable CMOS imager. The image sensor 114 can be configured to see the same bore-sighted image and reticle as the direct view channel (e.g., the view provided to the user by a combination of the front end optical system 110 and the eyepiece 112). The image sensor 114 and associated electronics and modules can be configured to provide greater magnification compared to the direct-view channel (e.g., through an electronic zoom functionality) and/or an image recording functionality.

The sight system 100 can include a display system (not shown) that shares the eyepiece 112 with the front end optical system such that the sight system 100 can provide a direct-view mode where the user sees the image produced by the combination of the front end optical system and the eyepiece, and a video view mode where the user sees the image acquired by the image sensor 114 and presented on the display system through the eyepiece 112. The display system can be, for example, monochrome or color and can conform to a video or resolution standard such as SXGA, VGA, HD720, HD1080, WGA, and the like. The display system can be configured to present magnified imagery from the direct view channel by displaying and magnifying image data acquired by the image sensor 114. The display system can be configured to present imagery or information from any module mounted to the module rails 108 such as a rail-mounted thermal or other spectral band camera. The display system can be configured to present a ballistics-corrected reticle which may be derived from, for example, a mounted LRF.

Thus, the sight system 100 can be configured to provide direct view sighting, video sighting, video identification, video recording, a data interface display, and the like. The sight system 100 can be configured to accept a range of other capabilities by providing a modular attachment system with the module rails 108 using a standardized electrical, data, and mechanical interface. For example, the rails can be similar to power rails manufactured by T. Worx Ventures as described in U.S. Pat. No. 7,627,975, Wilcox Industries' fusion rail system, or NATO's powered rail standard. The sight system 100 can integrate infrared functionality thereby reducing or eliminating a need for using clip-on thermal imagers which can add to the weight of the gun, alter the balance of the gun, and may be misaligned relative to the bore of the gun. In some embodiments, the sight system 100 can provide a direct view channel and a relatively high-sensitivity CMOS channel to provide sighting during diurnal intervals of low thermal contrast.

In some embodiments, the sight system 100 can include a radio frequency ("RF") communication system 116 situated within the housing 102. The RF communication system 116 can be configured to communicate with external systems such as, for example, visualization systems, night vision goggles, data processing systems, weapons systems, computers, cellular telephones, PDAs, laptops, or other such electrical devices associated with the user or another person. The RF communication system 116 can be utilized to transmit and receive information to these other systems to integrate information from the sight system 100 to other systems. For example, the sight system 100 can be utilized in a rapid target acquisition ("RTA") system that combines imagery and other information from the sight system 100 with information from a visualization system of a user to provide the user with a video display that shows the pointing direction of the sight system on the display of the visualization system. In this way, the user can quickly adjust an aiming point without looking through the sight system 100. In some embodiments, the RF communication system 116 can communicate using any suitable wireless communication such as through the IEEE 802.11 standard, including IEEE 802.11(a), (b), (g), or (n). In some embodiments, the RF communication system 116 communicates according to BLUETOOTH™ Specification Version 3.0+HS adopted in 2009. In some embodiments, the RF communication system 116 transmits and receives CDMA, GSM, AMPS or other known signals that are used to communicate within a wireless cell phone network. In some embodiments, the RF communication system 116 is an ultra-wide band communication system. In some embodiments, the RF communication system 116 is configured to communicate with devices that are less than about 10 m from the sight system 100. The RF communication system 116 can be configured to have a low probability of interception and/or a low probability of detection and a relatively high bandwidth.

In some embodiments, the sight system 100 can include integrated sensors to provide data to the sight system 100, to attached modules, or to external systems through the RF communication system 116. The integrated sensors can be, for example, tilt sensors, inertial sensors, accelerometers, or the like. In some embodiments, information from the integrated sensors and an attached LRF can be used to derive a ballistics-corrected reticle for display on the display system.

The sight system 100 can include a power source 118 situated within the housing 102. For example, the housing can include one or more batteries to provide power to the electrical components in the sight system 100 and/or to modules attached to the module rails 108.

The sight system 100 can be configured to be relatively light-weight compared to other sight systems providing similar functionality. For example, the sight system 100 can be configured to weigh less than or equal to about 3 lbs., less than or equal to about 2 lbs. or less than or equal to about 1.5 lbs. Based at least in part on additional capabilities provided by the sight system 100 and the significant weight reduction associated with use of rail-mounted imagers or LRF modules in place of stand-alone weapon mounted systems, the total weight of a gun or weapon system incorporating the sight system 100 can be significantly reduced.

Figure 2:
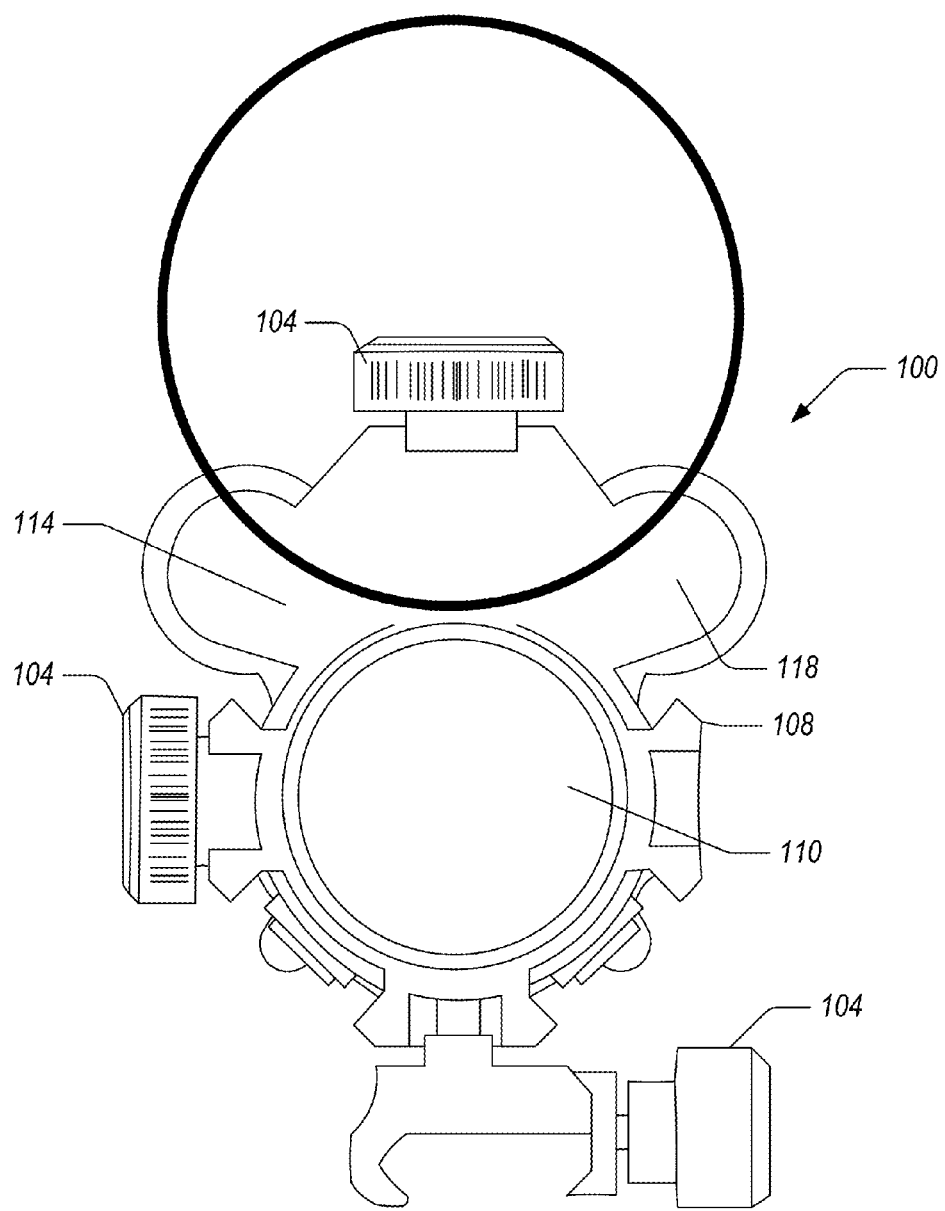
FIG. 2 illustrates an example embodiment of a sight system configured to support an additional infrared imager with a relatively large aperture.

FIG. 2 illustrates an example embodiment of a sight system configured to support an additional infrared imager with a relatively large aperture. The configuration of the example sight system 100 illustrated in FIG. 1 can be inverted to accommodate an additional imager. For example, if apertures that are larger than 60 mm are envisioned for long-range thermal sensors, the sight system 100 can be configured to place the image sensor 114 and associated relay optics above the direct-view front end optics 110 thereby allowing room for a larger IR aperture without obscuration of the direct-view optics 110.

Example Optical Configurations

Figure 3:
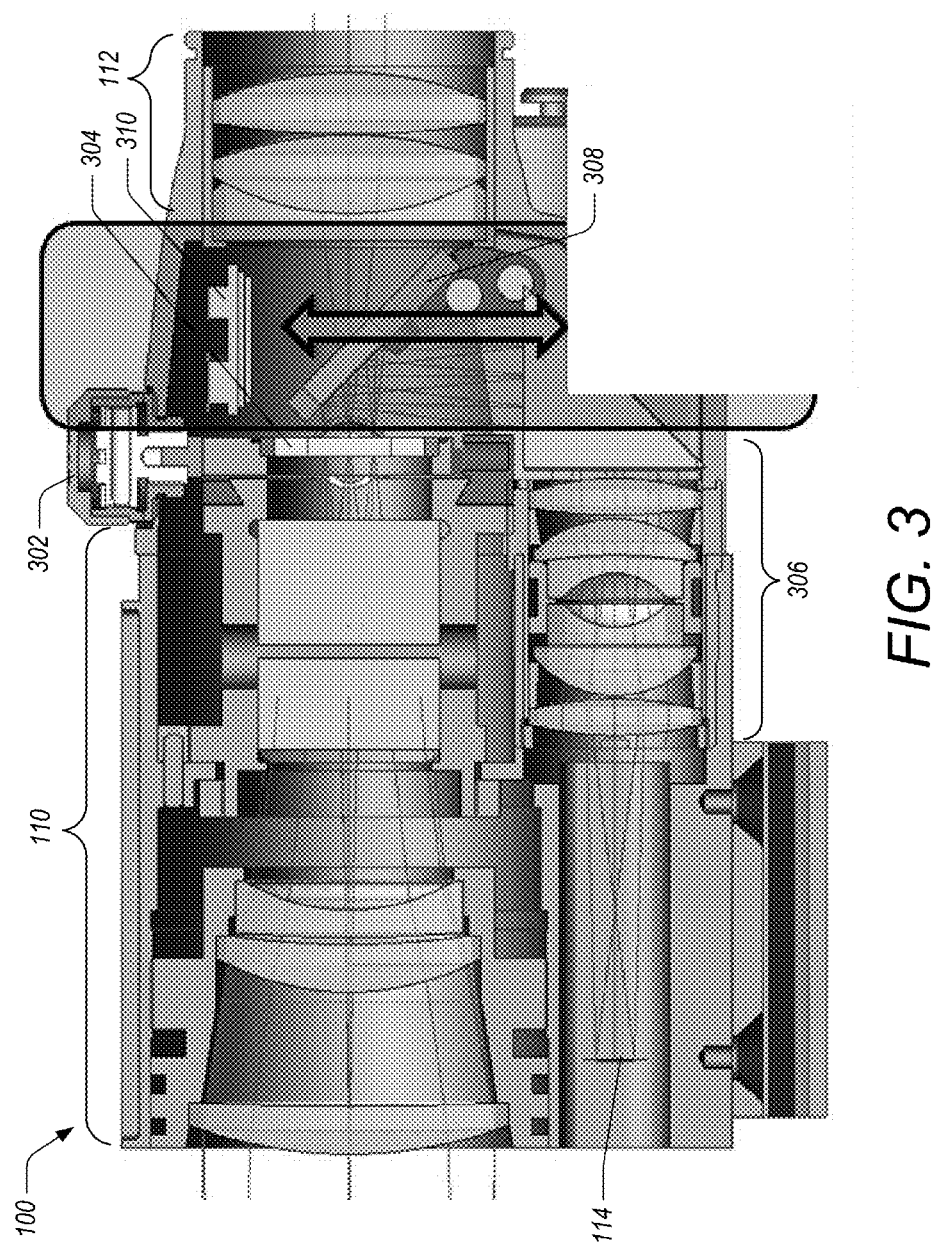
FIG. 3 illustrates cut-away view of an example sight system to illustrate sample optical components that provide bore-sighted optical and video display modes.

FIG. 3 illustrates cut-away view of an example sight system 100 to illustrate sample optical components that provide bore-sighted optical and video display modes. The sight system 100 includes a display system 310, an image sensor 114, front end optics 110, relay optics 306, eyepiece optics 112, and a dichroic mirror 308 configured to be moveable from a position in an optical path between the front end optics 110 and the eyepiece optics 112 and out of the optical path. The dichroic mirror 308 can be positioned in the optical path to redirect electromagnetic radiation received from the front end optics 110 to the relay optics 306 and to direct video imagery from the display system 310 to the eyepiece optics 112. The arrow in FIG. 3 indicates an example of how the mirror can move in and out of the optical path. The dichroic mirror 308 can be any variable beamsplitter, such as a prism, polarizing beamsplitter, neutral density beamsplitter, half-silvered mirror, or the like.

The sight system 100 can include a reticle 304 positioned at a real image plane of front end optics 110 such that the reticle is visible to a user in a direct-view mode and is part of video acquired by the image sensor 114 and displayed by the display 310. The sight system 100 can include a reticle adjustment control 302 configured to move the position of the reticle 304.

The display 310 of the sight system 100 can be positioned at a substantially similar distance from the dichroic mirror when it is in the optical path as compared to the reticle 304. Thus, the eyepiece optics 112 can remain static or unchanged to view an image produced by the display 310 or an image produced by the front end optics 110. In some embodiments, the display 310 can be configured to display information from attached modules. The information from attached modules can be combined with the imagery acquired by the image sensor 114 or it can be displayed without any data from the image sensor 114. The modules or peripheral modules can include pointing modules (e.g., lasers or laser pointers), illumination modules (e.g., SWIR illuminators), sensor modules (e.g., accelerometers), imaging modules (e.g., thermal imagers), or the like.

The relay optics 306 of the sight system 100 can be configured to produce an image of the real image plane of the front end optics 110 at the image sensor 114. This can include an image of the reticle 304 such that the video recorded and/or displayed includes the reticle 304. By providing the bore-sighted image and/or reticle 304 to the image sensor 114, add-on modules can use the bore-sighted video, such as, for example, infrared imagers, SWIR imagers, UV imagers, IR pointers, SWIR pointers, UV pointers, LRFs, or any combination of these or other modules. The relay optics 306 can be adjusted to adjust the image plane for the image sensor 114. By changing the relay optics 306, the image plane for the image sensor 114 can be changed as well as the field of view at the image sensor, the f-number, and the like.

Figure 4:
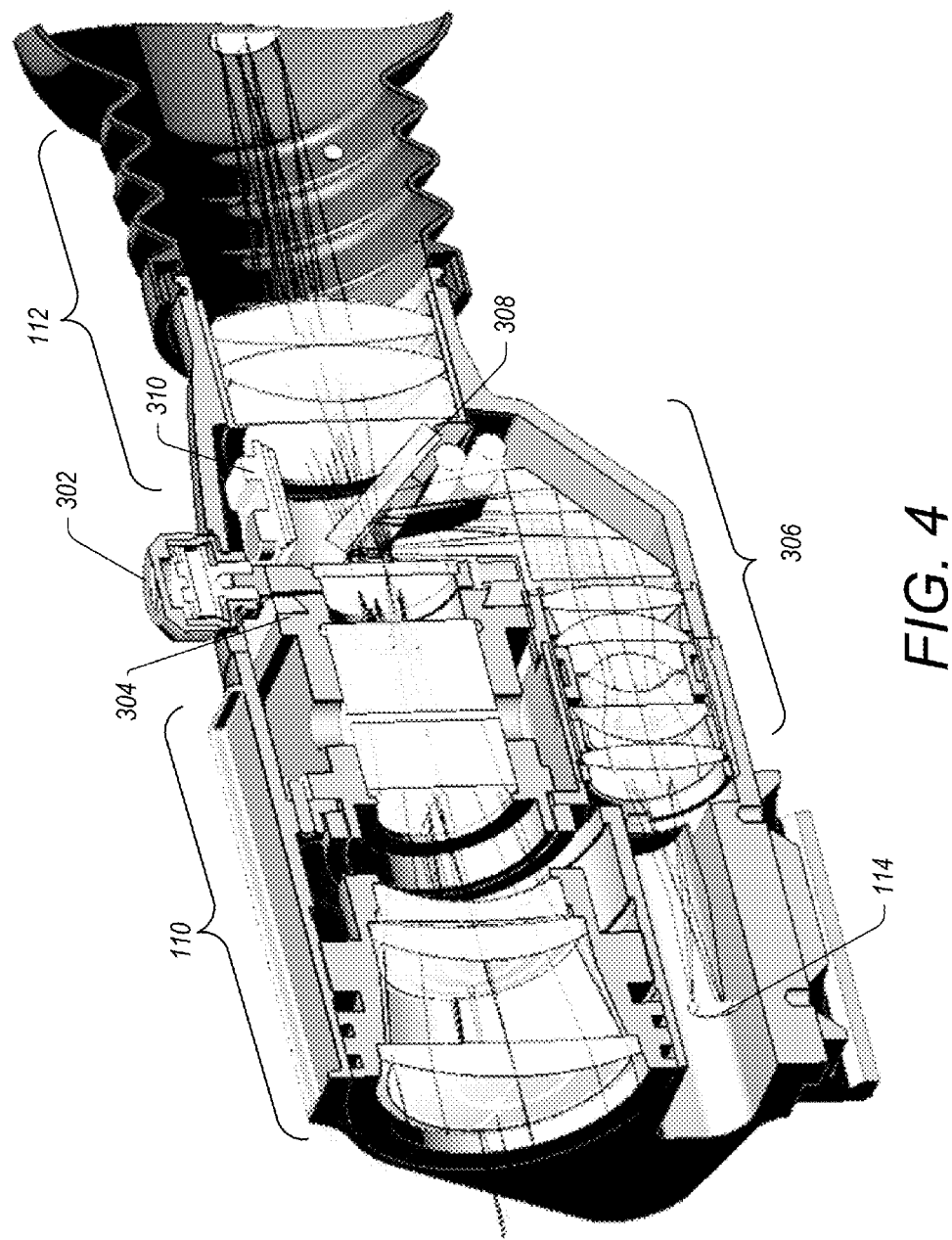
FIG. 4 illustrates a cut-away view of another example sight system to illustrate another optical configuration configured to provide bore-sighted optical and video to a user.

FIG. 4 illustrates a cut-away view of another example sight system 100 to illustrate another optical configuration configured to provide bore-sighted optical and video to a user. This embodiment can provide a greater field of view when compared with the example embodiment illustrated in FIG. 3 which provides about a 4× magnification for a direct-view with about a 7 degree field of view for the front end optics 110 with a 28 degree field of view for the eyepiece optics 112. The example embodiment illustrated in FIG. 4 can provide a 4× magnification for a direct-view with an 8 degree field of view for the front end optics 110 and a 32 degree field of view for the eyepiece optics 112 with a similar length of front end optics 116. The sight system 100 illustrated in FIG. 4 is configured to move the direct-view image plane, being equivalent in size to the display size, to an illuminated etched glass reticle 304 location with sufficient back focal length ("BFL") for the shared eyepiece optics 112 to allow smooth insertion of the fold mirror 308 and relay optics 306 reducing or eliminating mechanical interference or side protuberance from the housing 102. The optics of the sight system 100 can be configured to preserve a direct view f-number (e.g., a nominal value of F/3.2) to the image sensor 114 for relatively high resolution and high (e.g., low light) sensitivity.

Figure 5:
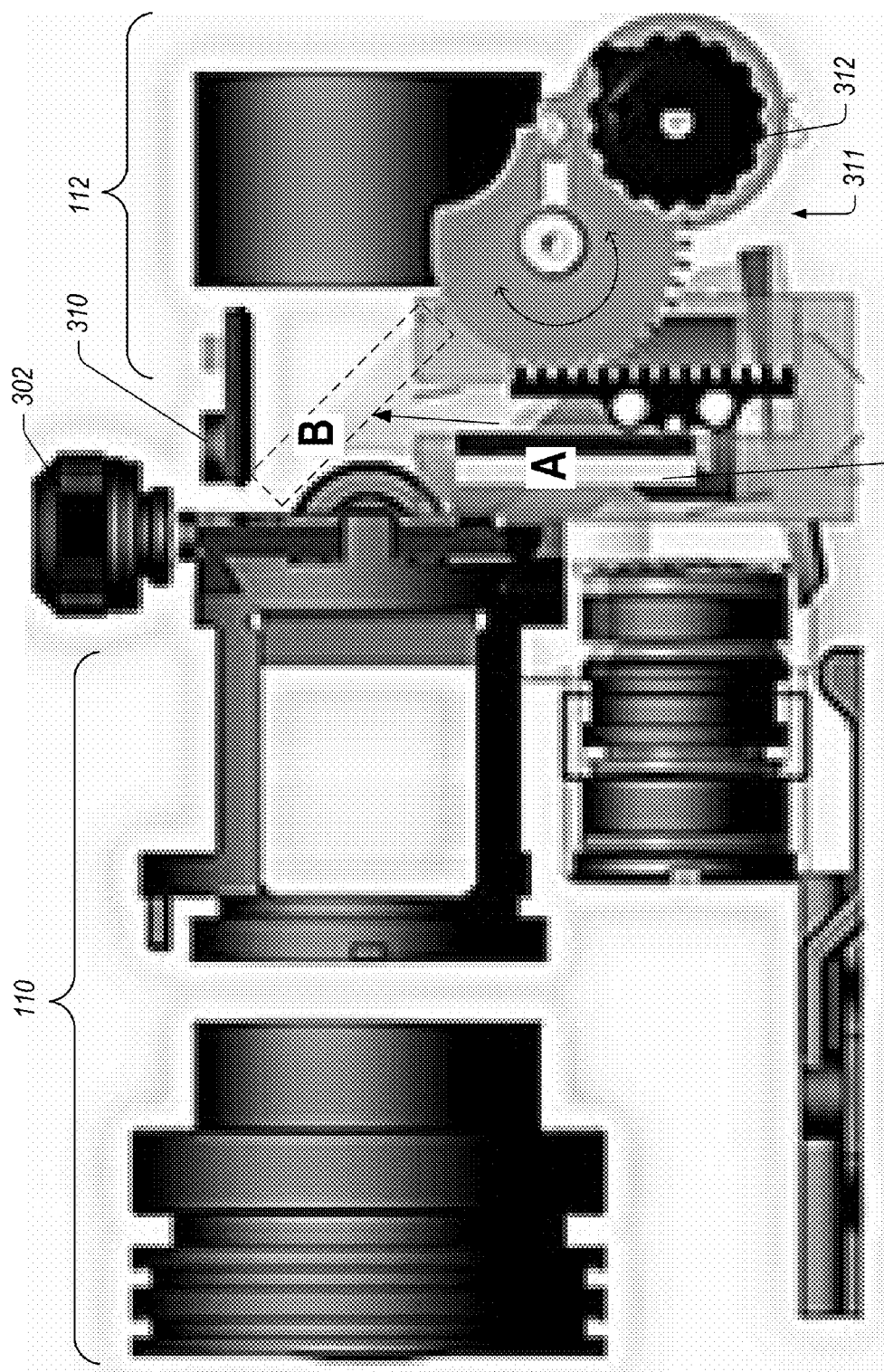
FIG. 5 illustrates an example switching system configured to move a mirror in and out of the optical path of front end optical components to switch between a direct-view mode and a video-view mode.

FIG. 5 illustrates an example switching system 311 configured to move a folding mirror 308 in and out of the optical path of the front end optics 110 to switch between a direct-view mode and a video-view mode. The switching system 311 can be a single rotating shaft control which allows the housing 102 to be sealed from moisture. The switching system 311 can be configured to move the mirror 308 horizontally, vertically, or diagonally to move it in and out of the optical path. The switching system 311 can include a user control 312 coupled to a gear system 314 coupled to the mirror 308. By turning the control 312, the gear system 314 moves the mirror 308 in and out of the optical path. For example, when the mirror 308 is in position A (as shown in FIG. 5), the mirror 308 is stowed and out of the optical path so that the sight system 100 provides a user with a direct view of a scene. To put the sight system 100 into a video-view mode, the mirror 308 is moved into position B, intersecting the optical path, to direct the imagery from the front end optics 110 to the relay optics and the image sensor 114 which converts the imagery into an electrical signal that is displayed by display 310. The displayed image is reflected by the mirror 308 into the eyepiece optics 112. Other methods for moving the mirror 308 in and out of the optical path can be used, such as using slides, electric gears, actuators, and the like.

Figure 6A:
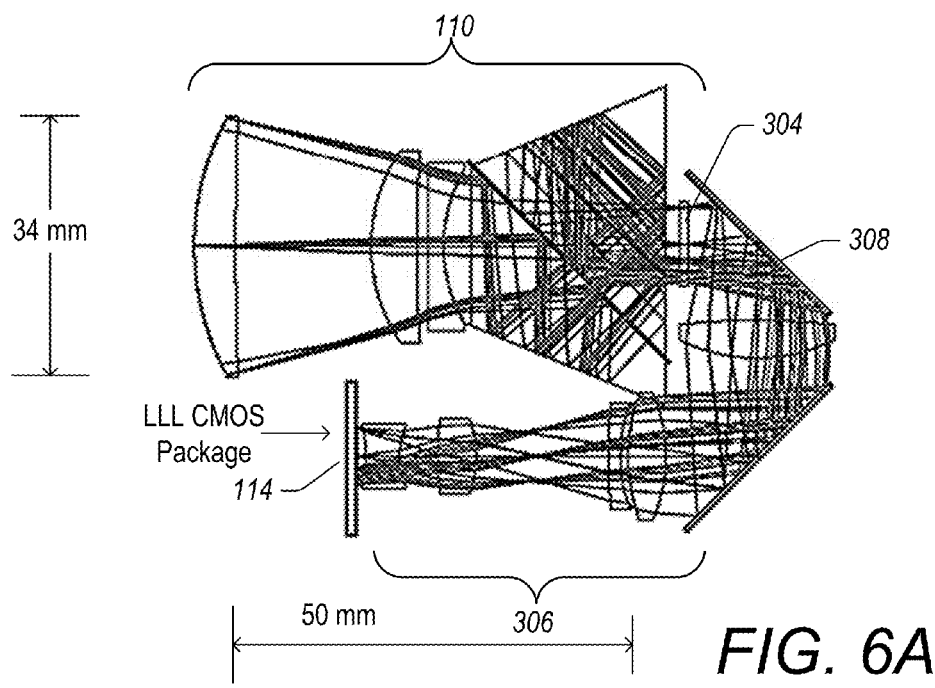
FIGS. 6A and 6B illustrate example optical components configured to provide bore-sighted imagery to an image sensor.
Figure 6B:
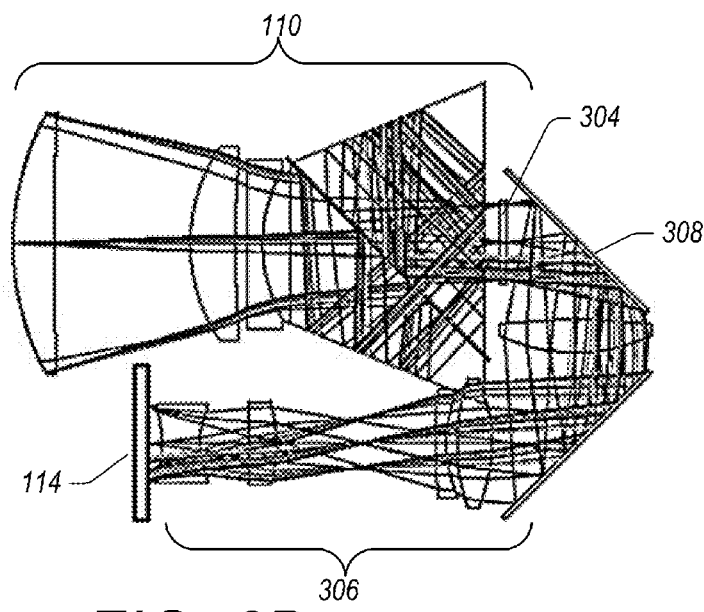

FIGS. 6A and 6B illustrate example optical components configured to provide bore-sighted imagery to an image sensor 114. FIG. 6A illustrates front end optics 110 comprising converging and diverging lenses and prisms to produce an image at image plane 304. The prisms can be used to fold the optical path within the housing 102 to decrease the physical length of the front end optics 110. The prisms can be, for example, Pechan prisms that are oriented vertically (e.g., rather than horizontally, as illustrated in FIG. 4) to increase volume efficiency by matching vertical space used by the fold mirror 308 and relay optics 306 and the display cavity. The vertical orientation can also keep a width of the front end optics 110 narrow for use with side-rail mounted sensors. In some embodiments, the Pechan prism corners can be cropped to match the ray bundle reducing or eliminating any apparent mechanical interference at these corners in the figure.

The front end optics 110 can have a nominal f-number of about F/3.2, and can range between about F/1.4 to about F/16. In some embodiments, the front end optics 110 are configured to support a SXGA 6.5 micron pixel LLL CMOS or SiOnyx black silicon image sensor to cover thermal transitions in the diurnal cycle. For example, the signal from the visible portion of the spectrum and the signal from the SWIR portion of the spectrum can be multiplexed to provide enhanced or increased contrast during thermal transition periods (e.g., around dawn and dusk) where thermal contrast is not sufficient to effectively distinguish objects in a scene. Thus, the sight system 100 can be used to provide effective bore-sighted visualization capabilities in many light level conditions, e.g. during day using a direct-view or SWIR imaging, during night using LLL imaging or SWIR imaging, and during diurnal thermal transition periods using LLL and/or multiplexed LLL and SWIR imaging. In some embodiments, the front end optics 110 support a commercial CMOS image sensor having greater than or equal to about 3 megapixels, greater than or equal to about 4 megapixels, or greater than or equal to about 5 megapixels. The SiOnyx sensor mentioned above can be configured to be responsive to radiation having wavelengths up to about 1.2 microns. By coupling this sensor with low-noise readouts, sight system 100 can provide about 4× additional signal. By increasing the signal, the front end optics 110 having an f-number of about F/3.2 to reach well into low light level ("LLL") regions for thermal transition coverage as well as improved identification at quarter moon levels. The image sensor 114 can be selected to provide coverage of the SWIR electromagnetic region, thus allowing a single sight system 100 to provide direct-view capabilities, low light level capabilities, and SWIR imaging capabilities.

SWIR imaging can be useful because the SWIR band is not visible to the human eye but it is reflective like visible light. Thus, a SWIR illuminator module can be used in conjunction with the sight system 100 to cast SWIR light down range of the sight system 100 and the image sensor 114 can be configured to detect the reflected SWIR light. This can provide image data that facilitates object identification through contrast caused by shadows of objects, similar to visible light.

The optical design illustrated in FIG. 6A produces about a 7.76 mm diagonal image at the image sensor which can support a 9.7 micron pixel VGA LLL CMOS or about a 5 megapixel high-sensitivity CMOS imager. In the example embodiment, the height of the front end optics 110 can be about 34 mm and a length from the first lens element to the real image plane can be about 50 mm. The sizes of these components can differ, and can be increased or decreased. For example, the height can be at least about 20 mm and/or less than or equal to about 50 mm, at least about 25 mm and/or less than or equal to about 42 mm, at least about 30 mm and/or less than or equal to about 38 mm. The length can be at least about 30 mm and/or less than or equal to about 70 mm, at least about 40 mm and/or less than or equal to about 65 mm, at least about 45 mm and/or less than or equal to about 55 mm.

The optical design illustrated in FIG. 6B produces about a 16 mm diagonal direct-view image covering about 8° field of view in target space with about a 32° diagonal field of view presented to a user. In some embodiments, the display 310 diagonal can be about 15 min which delivers about 30° to the user from the display 310. Relative to the embodiment illustrated in FIG. 6A, the field of view can be increased and it can be slightly longer with space near the prisms and barrel of the sight system 100 getting smaller. The embodiment illustrated in FIG. 6B can produce an image having about a 10 mm diagonal at the image sensor which nominally supports a 6.5 micron SXGA or 9.7 micron SVGA.

The LLLCMOS field of view can be configured by modifying the relay optic 306 design and CMOS package size constraints. The design of the relay optics 306 can be modified and moved to deliver a larger field of view, up to the full field of view provided by the front end optics, by using a compatible focal plane array with an appropriate active image area.

Figure 7:
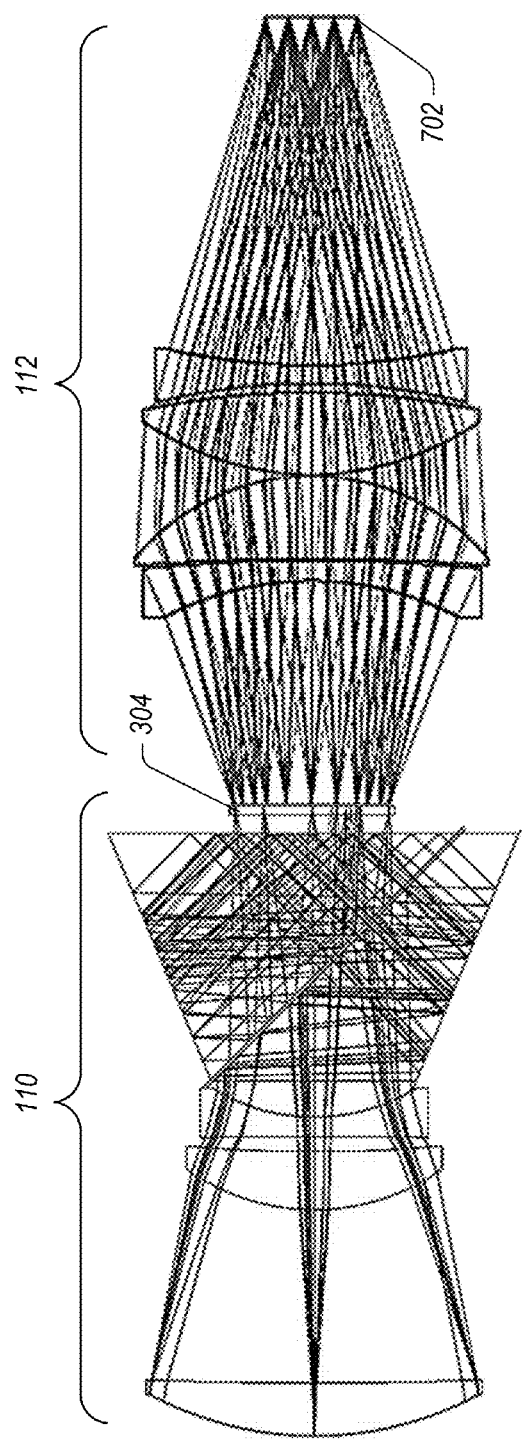
FIG. 7 illustrates a light path from the front end optics through the eyepiece optics.

FIG. 7 illustrates a light path from the front end optics 110 through the eyepiece optics 112. The shared eyepiece optics 112 (e.g., the eyepiece views either the direct view image and reticle or display) added to the direct view front end optics 110 can provide a full optical track that is less than or equal to about 6 inches, less than or equal to about 5.5 inches, or less than or equal to about 5 inches, while providing eye relief at between about 0.5 inches and about 2.5 inches, nominally about 1.5 inches, for a relatively large field of view from the eyepiece 112. The front end optics 110 can be configured to deliver an image plane about 16 mm in diagonal. The eyepiece optics can be configured to deliver about 32° field of view in the direct-view mode and about 30° field of view in the video-view mode. The image presented at the eye relief 702 can be between about 7 mm and 13 mm in diagonal, with a nominal value of about 10 mm in diagonal.

Additional examples of a site system are described herein with reference to FIGS. 12A-12J.

Optical Performance

FIG. 8 is a plot of imaging performance at a reticle 304 of a sight system 100 according to some embodiments. The example sight system 100 direct-view channel, relay optics, and eyepiece module have been tested for optical performance. FIG. 8 shows the near diffraction limit modulation transfer function ("MTF") performance delivered from direct-view front end optics 110 through Pechan prisms to an image plane at an adjustable hard reticle location 304. This is the direct view image presented to the eye via the eyepiece 112 and to the relay chain 306 servicing the image sensor 114. The average is about 70% at 80 cy/mm.

FIG. 9 is a plot indicating resolution performance through a relay optic chain 306 to an imaging sensor 114 of a sight system 100 according to some embodiments. The resolution performance predictions displayed in FIG. 9 through the relay optic chain 306 to the internal imaging sensor 114 indicate performance for this channel is within 20% of the diffraction limit and suited to LLL CMOS and other devices available to deliver high sensitivity and resolution at this location.

Figure 10:
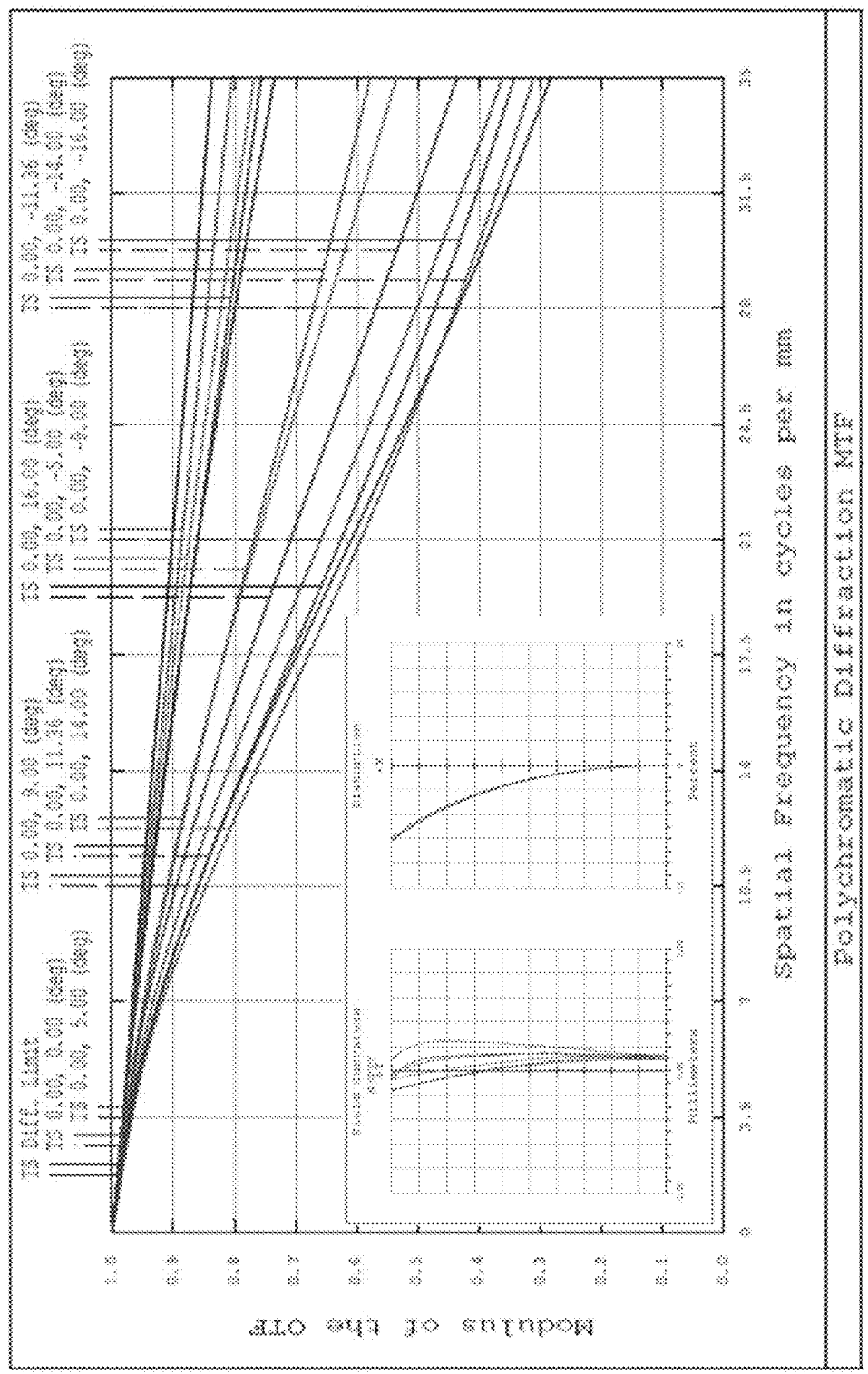
FIG. 10 is a plot of imaging performance of an example eyepiece assembly delivering resolution from a direct view image and a display to an eye of the user.

FIG. 10 is a plot of imaging performance of an example eyepiece assembly 112 delivering resolution from a direct-view image and a display 310 to an eye of the user. Eye MTF emerges as a significant range influence in system modeling unless eyepiece field of view, MTF, and display pixel pitch are designed to address this foveal MTF performance over the anticipated light levels and resultant pupil size. FIG. 10 indicates the eyepiece 112 delivers this performance with central field MTF of about 70% to 80% at 17.5 cy/degree to deliver a high resolution image from the display 310 as well as have sufficient MTF to deliver high resolution direct-view imagery to the eye during high light level conditions where the smaller eye pupil size can deliver the resolution to the retina. Combined sight distortion through the eyepiece is held at less than about 6% at the edge of circular field. FIG. 10 supports the resolution and contrast benefit of the high resolution imaging sensor channel, which can deliver both higher brightness and contrast to the eye, as well as electronically zoomed lower spatial frequency when desired to get increased identification capability under more stressing light or scene contrast conditions.

Electrical Components in the Sight System

Figure 11A:
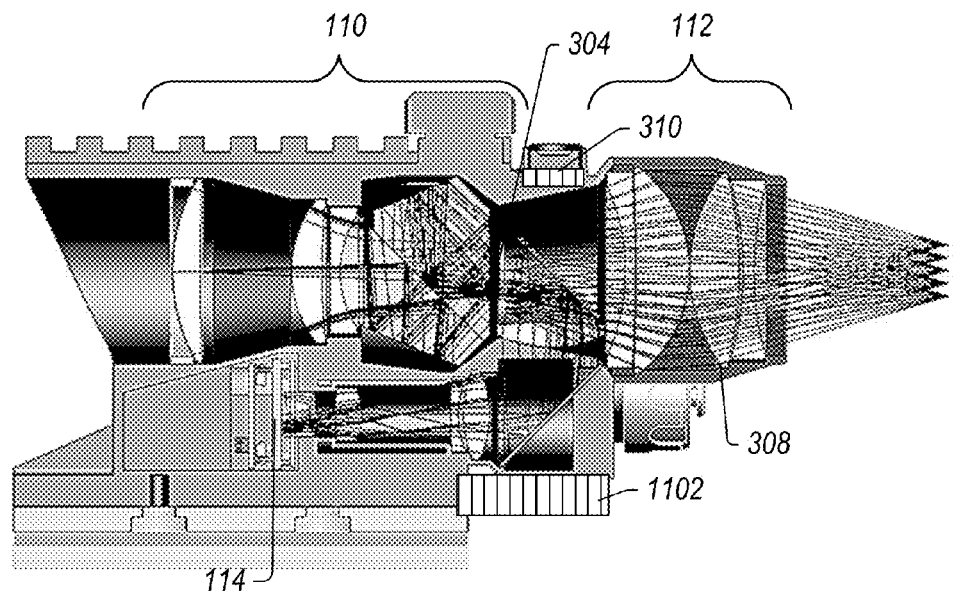
FIGS. 11A and 11B illustrate side and top cut-away views of an example sight system showing placement of associated electrical components within a housing of the sight system.
Figure 11B:
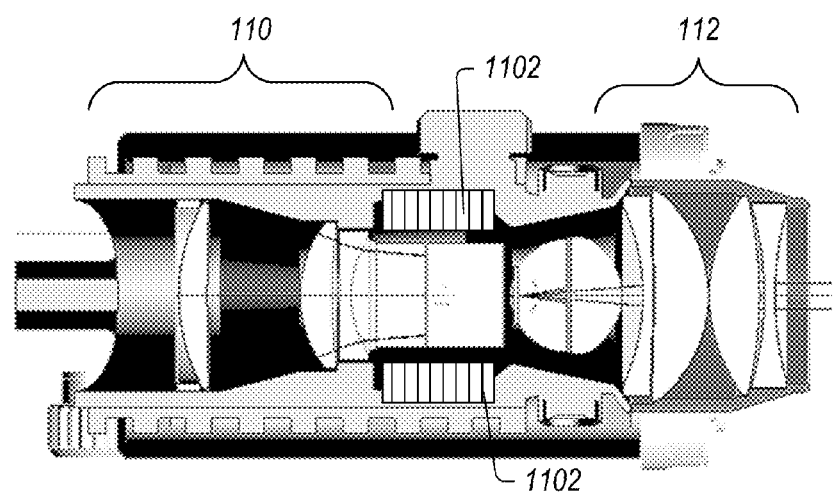

FIGS. 11A and 11B illustrate side and top cut-away views of an example sight system 100 showing placement of associated electrical components 1102 within a housing 102 of the sight system 100. The layout can be based at least in part on the optic layouts and included volumes for relatively small electronic circuit cards on either side of the Pechan prism assemblies, above the front end optics 110, and below the eyepiece 112. For example processing modules and electronics can be positioned within the housing to perform image processing and display logic. The electronics can include processors, memory, integrated circuits, logic control, RF communication components, antennas, transceivers, and the like to provide desired processing and/or communication capabilities.

Additional Site Systems Examples

Figure 12G:
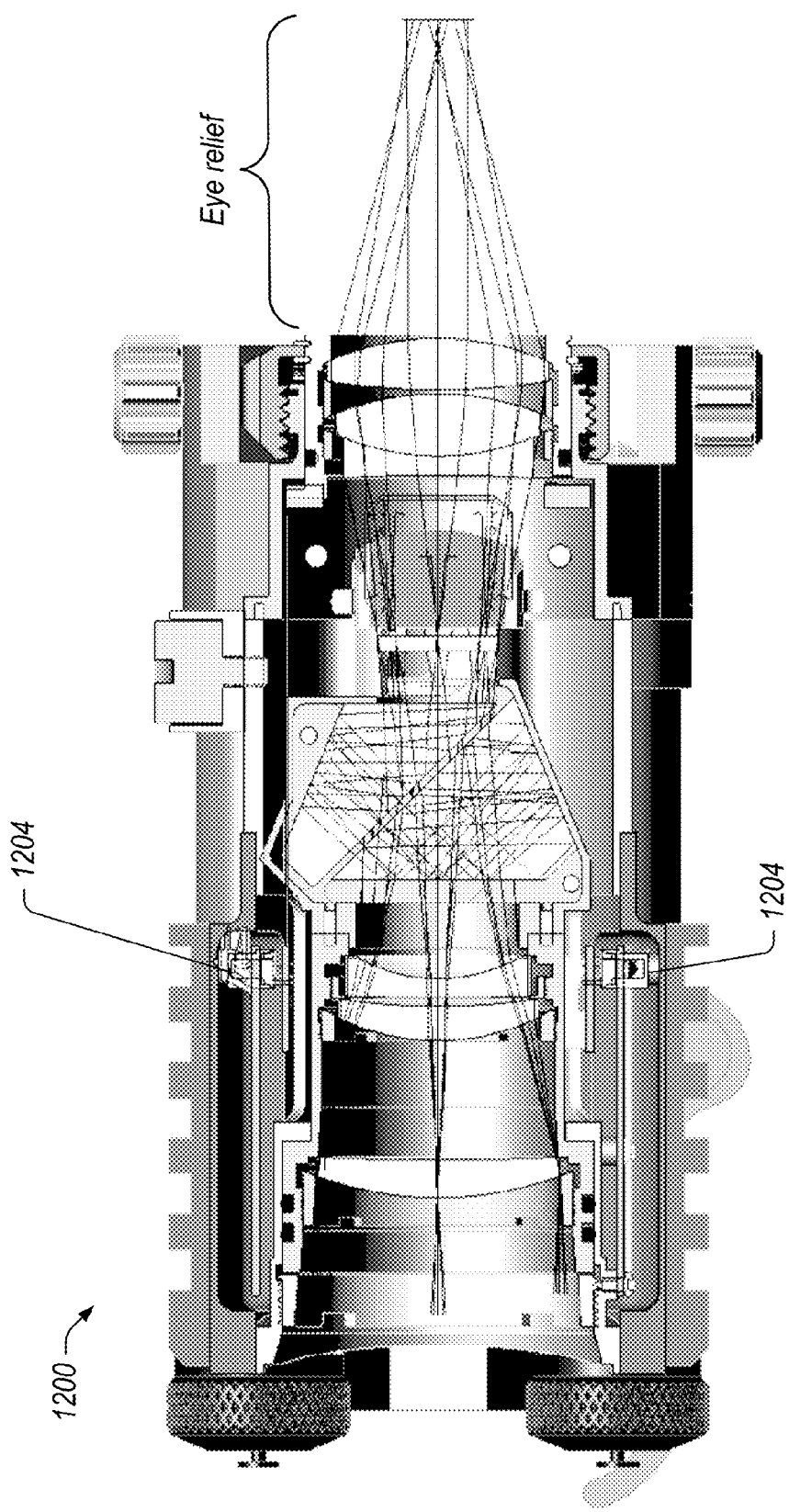

FIGS. 12A-12J illustrate various views of another example embodiment of a site system 1200. FIG. 12A illustrates a perspective view of the site system 1200 showing a diopter adjustment 1202. The site system 1200 can also include electrical and/or optical data link interfaces 1204 configured to allow the quick addition of modules configured to optically and/or electronically communicate using compatible electrical and/or optical data link interfaces. The site system 1200 includes a left- or right-hand switch 1206 to switch between a day-site or direct-view site and a video site. The switch 1206 can also be used as a video control (e.g., switch between high resolution video, external sensor video, etc.). The site 1200 includes battery compartments 1208. FIG. 12B illustrates another perspective view of the site 1200 that shows the sensor video channel location 1210. The sensor can include a CMOS sensor, CCD sensor, or the like. FIG. 12C illustrates another perspective view of the site 1200 that illustrates the electrical and/or optical data link interfaces 1204 on the top and side rails and the switch 1206 on either or both sides of the site 1200.

FIG. 12D illustrates a top view of the site 1200 along with some ray traces showing convergence of the light from the eyepiece. In some embodiments, the length of the site 1200 can be between about 100 mm and about 200 mm, and can be between about 140 mm and about 160 mm FIGS. 12E and 12F illustrate respectively front and side views of the site 1200. The width of the optical portion of the site 1200 can be between about 60 mm and about 80 mm, or between about 65 mm and about 75 mm. The full width of the site 1200 can be between about 70 mm and about 100 mm, or between about 80 mm and about 90 mm. The height of the site 1200 can be between about 80 mm and about 100 mm, or between about 80 mm and about 90 mm.

FIG. 12G illustrates a cutaway top view of the site 1200 illustrating an optical path of light through the site 1200. The site can include electrical and/or optical data link modules 1204 coupled to electrical circuitry configured to process and/or transmit the information to RF transceivers, other modules coupled to the site 1200, a firearm to which the site 1200 is coupled, or any combination of these or the like. The eye relief from the site 1200 can be between about 20 mm and about 70 mm, or between about 30 mm and about 50 mm.

Figure 12H:
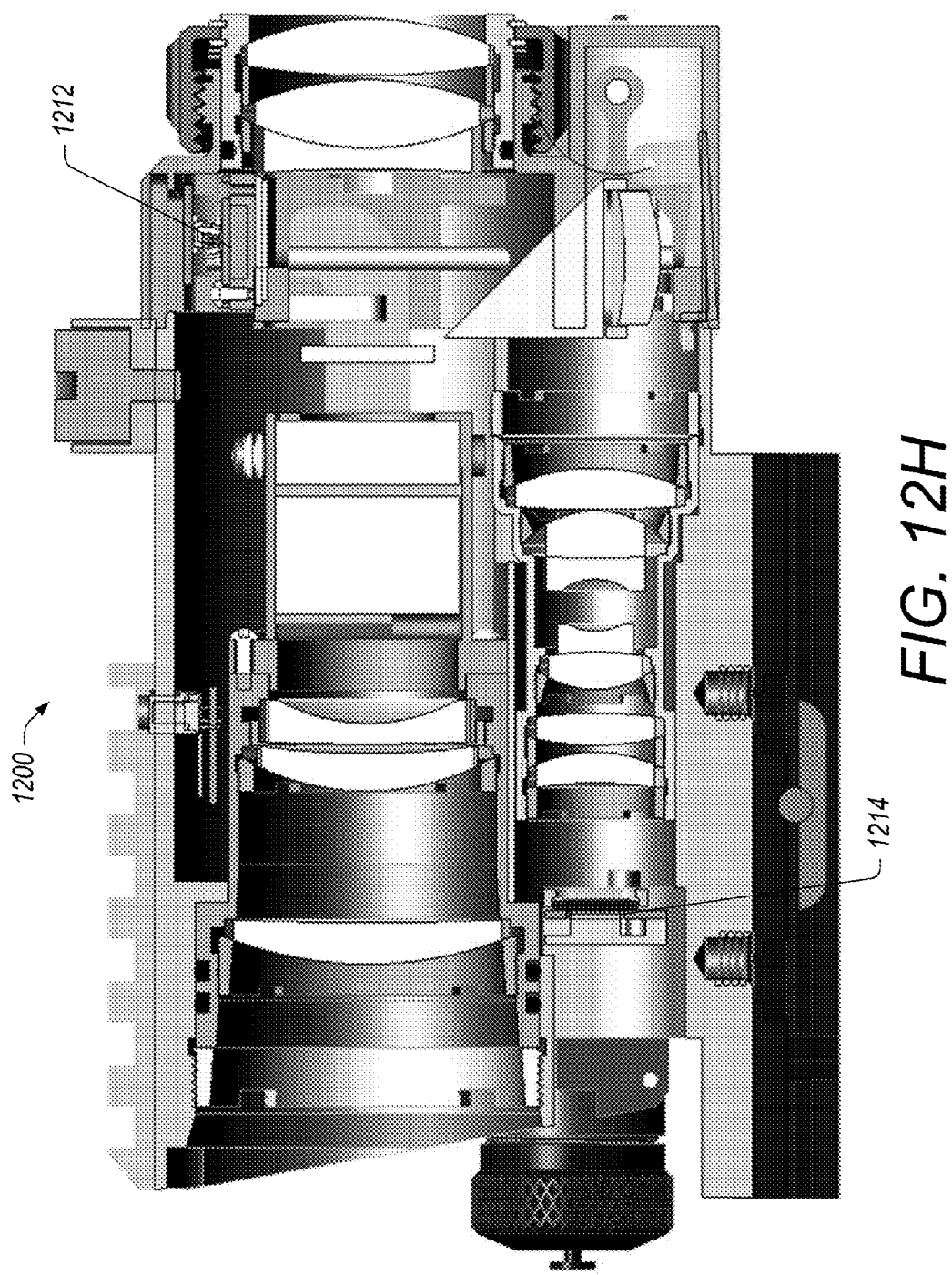

FIG. 12H illustrates a cutaway side view of the site 1200 illustrating a dual optical path. One optical path allows for the direct view of the field-of-view provided by the optical components. One optical path directs the field-of-view to the image sensor 1214 (e.g., CMOS imager). A display 1212 (e.g., a high definition color display) can then be viewed through the eyepiece, the display 1212 providing a view of the field-of-view captured by the image sensor 1214. A switch can be used to switch between the direct view and video views.

Figure 12J:
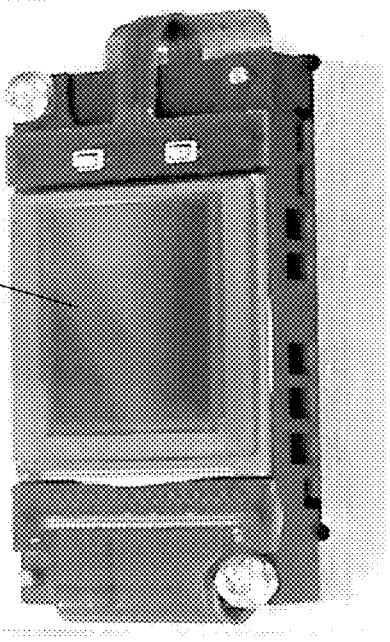
Figure 12I:
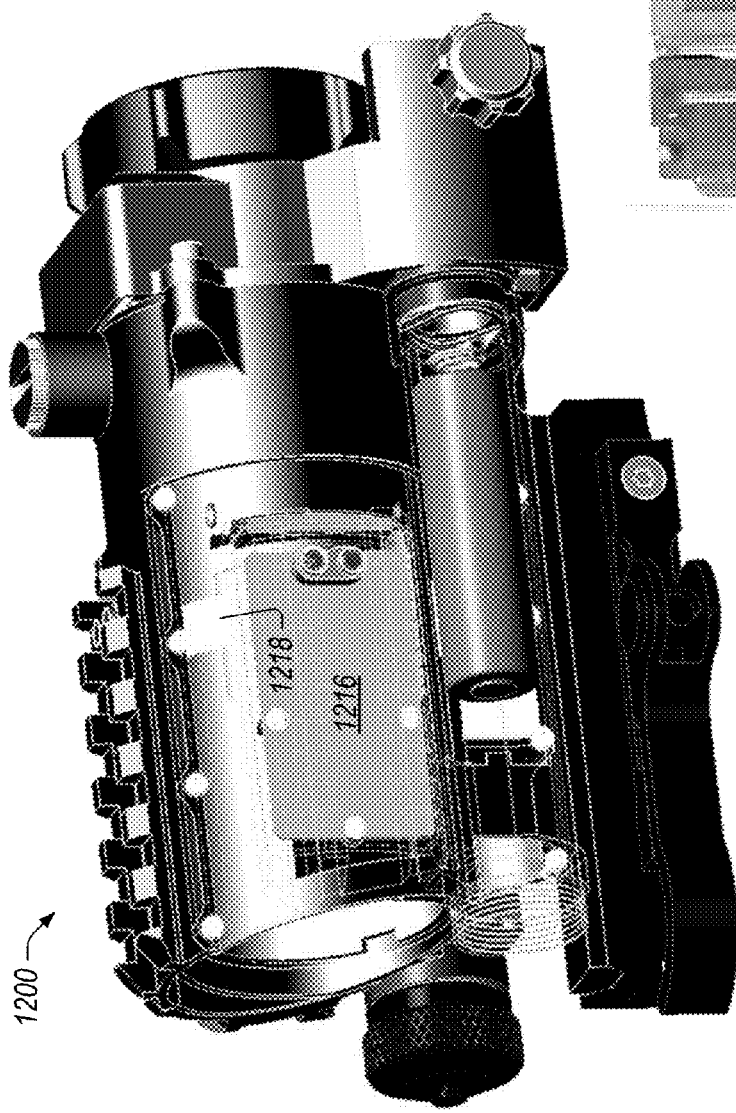

FIG. 12I illustrates a perspective view of the site 1200 having a removable sealed side cover 1216. The side cover 1216 allows access to an external sensor module interface card 1218. FIG. 12J illustrates an example display 1212 for use with the site 1200. The display 1212 can be, for example, a microdisplay on an aluminum carrier.

Example Modules

An example module includes a night vision goggle incorporating an electronics module for add-on use with a sight system according to some embodiments. Sight and display modules can be configured to utilize standardized interfaces that allow system capabilities, such as thermal imaging and range-finding, to be added and quickly bore-sighted to the sight system 100 in a modular form. The example night vision goggle can provide a SXGA display and 60 Hz frame rate electronic module designs that can be adapted as the basis for electronics and display to be developed for the sight system 100.

Figure 13:
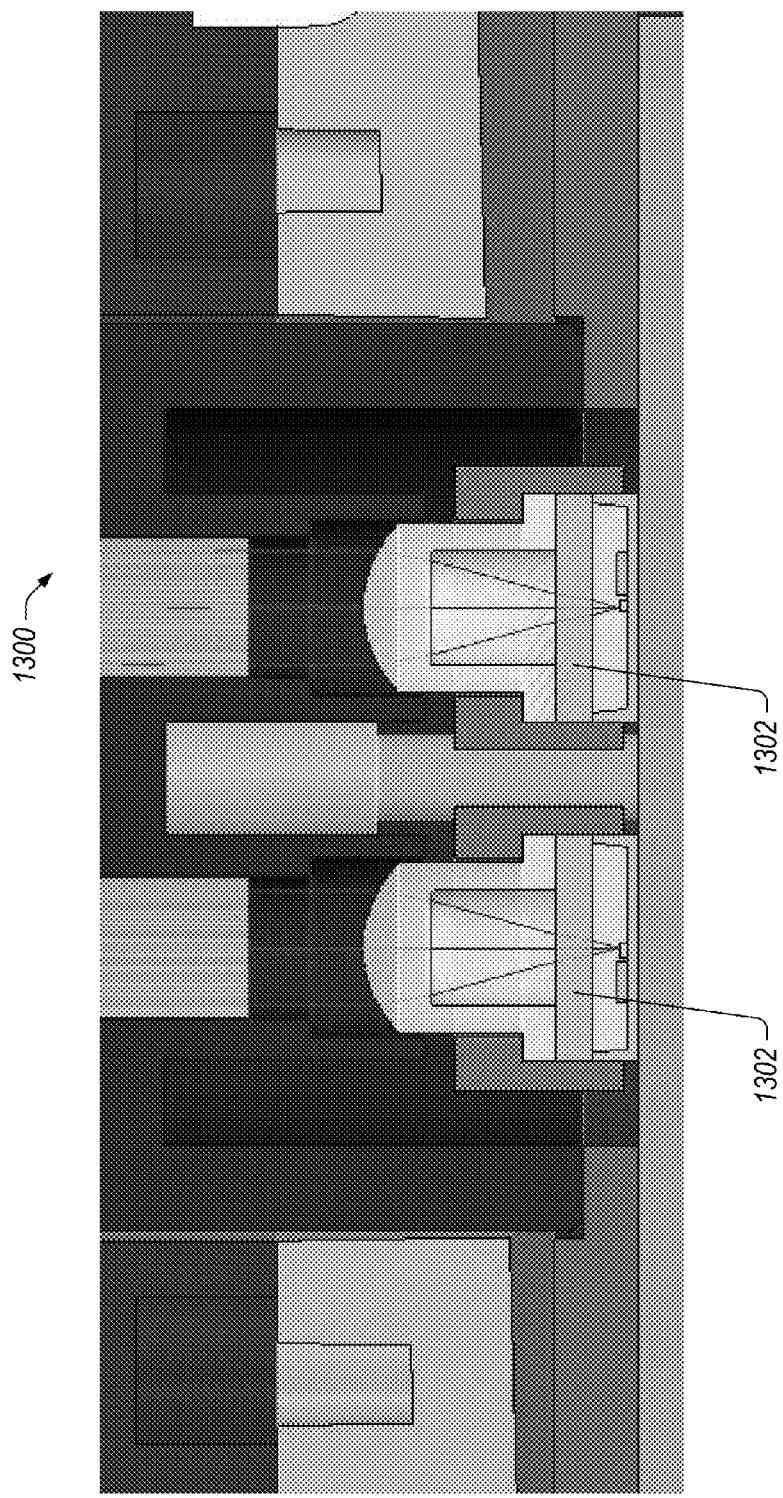
FIG. 13 illustrates example optical transmitter and receiver modules with gap coupling optics for use with a rail system of a sight system according to some embodiments.

FIG. 13 illustrates example optical transmitter and receiver module 1300 with gap coupling optics 1302 for use with a rail system 108 of a sight system 100 according to some embodiments. The relatively low power miniature optical transmitter and receiver modules 1300 and small wide gap coupling optics 1302 can be used to transmit high-bandwidth data across fiber optics and can be used to couple high speed data and video across the rail mount between the sight system 100 and its add-on modules.

Figure 14:
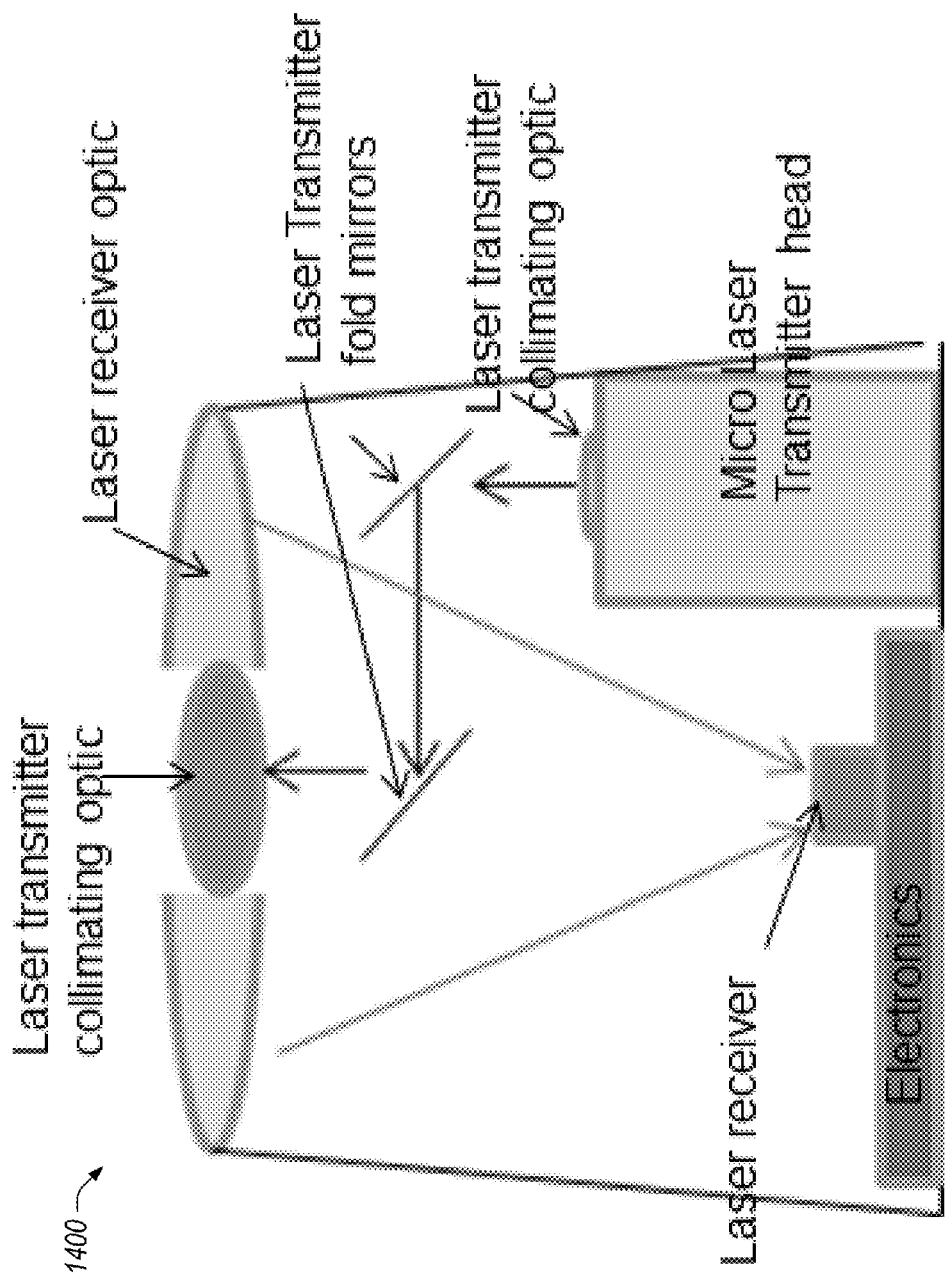
FIG. 14 illustrates an example coaxial microlaser-based laser range finder transceiver module configured for use as an add-on module to a sight system according to some embodiments.

FIG. 14 illustrates an example coaxial microlaser-based laser range finder transceiver module 1400 configured for use as an add-on module to a sight system 100 according to some embodiments. The Micro-LRF can use a diode-pumped erbium Microlaser. This micro-LRF module as designed can be configured to exhibit suitable intrinsic collimation, allowing placement of a relatively short and small diameter (e.g., about less than 10 mm) sub-milliradian collimating optic in front of the module for LRF use.

The LRF module 1400 using a version of this transmitter using about 100 micro-Joules and about a 25 mm diameter avalanche photodiode ("APD") receiver have achieved about 3 km range against typical reflectance targets. Mounting a second element of the transmitter collimating optic in a nominal 35 mm diameter receiver optic can leave sufficient collection area for the laser return signal (including slight blocking by the transmitter folding mirrors). In some embodiments, the LRF module 1400 can be used on the sight system 100 module rails 108.

CONCLUSION

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z each to be present.

In general, the word "module," as used herein, refers to logic embodied in hardware or firmware, or to a collection of software instructions, possibly having entry and exit points, written in a programming language, such as, for example, Java, C or C++, A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various illustrative logical blocks, modules, data structures, and processes described herein may be implemented as electronic hardware, computer software, or combinations of both. To dearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, data structures, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like. A processor may also be implemented as a combination of computing devices—for example, a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a non-transitory computer-readable storage medium such as RAM memory, flash memory, ROM memory, EPROM memory, EEPROM memory, registers, a hard disk, a removable disk, a CD-ROM, memory capable of storing firmware, or any other form of computer-readable storage medium. An exemplary computer-readable storage medium can be coupled to a processor such that the processor can read information from, and write information to, the computer readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

What is claimed is:

1. A sight system configured to provide a bore-sighted optical view and a bore-sighted video view to a user, the sight system comprising:
    a housing;
    an image sensor supported within the housing;
    a display supported within the housing, the display operably coupled to an output of the image sensor to display video acquired with the image sensor;
    a front end optical system supported within the housing, the front end optical system configured to generate a real image of a field of view at a front end image location in the housing;
    an adjustable reticle positioned at the front end image location in the housing, the adjustable reticle configured to be positionable within the housing;
    an eyepiece optical system configured to provide to a user an optical image of the real image of the field of view of the front end optical system;
    an optical redirection element configured to be positionable between the front end optical system and the eyepiece optical system on an image side of the adjustable reticle;
    a relay optical system configured to:
       relay the real image of the field of view of the front end optical system to the image sensor, and
       form an image of the adjustable reticle at the image sensor;
    wherein the eyepiece optical system is coaxial with the front end optical system along a single optical axis, wherein, in a direct-view configuration, the optical redirection element is positioned so as to not redirect an optical path between the front end optical system and the eyepiece optical system thereby providing an optical view of the real image of the field of view with the adjustable reticle so a user can directly see along the optical axis through the eyepiece optical system the real image produced by the front end optics and the eyepiece optical system in combination, without any redirection elements redirecting the optical path, and
    wherein, in a display-view configuration, the optical redirection element is positioned to redirect at least a portion of light from the front end optical system to the relay optical system so that the image sensor acquires video of the real image of the field of view with the adjustable reticle.

2. The sight system of claim 1, wherein the housing is configured to include a rail system for attaching a peripheral imaging, sensor, pointing, or illuminating module to the sight system.

3. The sight system of claim 2, wherein the rail system further includes a non-contact optical connector configured to couple optical signals between an attached module and the sight system.

4. The sight system of claim 3, wherein the display is further configured to display information from a peripheral module attached to the rail system, where information from the attached peripheral module is received through the non-contact optical connector.

5. The sight system of claim 2, wherein the rail system further includes an electrical connector configured to couple electrical signals between an attached module and the sight system.

6. The sight system of claim 1, wherein the sight system weighs less than or equal to about 2 lbs.

7. The sight system of claim 1, wherein the image sensor is configured to acquire infrared light.

8. The sight system of claim 7, wherein the image sensor is configured to acquire short wave infrared light.

9. The sight system of claim 1, wherein the image sensor comprises a low light level CMOS sensor.

10. The sight system of claim 1, wherein a field of view of the front end optical system is at least about 2 degrees and less than or equal to about 20 degrees.

11. The sight system of claim 10, wherein a field of view of the eyepiece optical system is at least about 15 degrees and less than or equal to about 40 degrees.

12. The sight system of claim 1, wherein the optical redirection element comprises a variable beamsplitter.

13. The sight system of claim 1, wherein, in the display-view configuration, the optical redirection element is further configured to provide a view of the display through the eyepiece optical system to provide a view of video acquired with the image sensor comprising the real image of the field of view with the adjustable reticle.

14. The sight system of claim 1, further comprising a reticle adjustment control configured to move the position of the adjustable reticle.

15. The sight system of claim 1, wherein the optical redirection element is configured to be movable between a first position in the optical path between the front end optical system and the eyepiece optical system and a second position out of the optical path between the front end optical system and the eyepiece optical system.

16. The sight system of claim 15, wherein the optical redirection element is in the first position in the display-view configuration and in the second position in the direct-view configuration.

17. The sight system of claim 1, configured to provide a polychromatic diffraction modulus transfer function (MTF) greater than 60% for spatial frequency between 0 cycles per mm and 80 cycles per mm in the direct-view configuration.

18. The sight system of claim 1, configured to provide a polychromatic diffraction modulus transfer function (MTF) greater than 60% for spatial frequency between 0 cycles per mm and 50 cycles per mm in the display-view configuration.

19. A method of providing a bore-sighted optical view and a bore-sighted video to a user, the method comprising:

forming a real image of a field of view at a front end image location in a housing using a front end optical system supported within the housing;

positioning an adjustable reticle at the front end image location in the housing;

forming an optical image of the field of view of the front end optical system using an eyepiece optical system wherein the eyepiece optical system is coaxial with the front end optical system along a single optical axis;

selectively redirecting an optical axis using an optical redirection element configured to be positionable between the front end optical system and the eyepiece optical system on an image side of the adjustable reticle by:

in a direct-view configuration, adjusting a position of the optical redirection element so as to not redirect an optical path between the front end optical system and the eyepiece optical system thereby providing an optical view of the field of view with the adjustable reticle so a user can directly see along the optical axis through the eyepiece optical system a real image produced by the front end optics and the eyepiece optical system in combination, without any redirection elements redirecting the optical path; and in a display-view configuration, adjusting a position of the optical redirection element to redirect at least a portion of light from the front end optical system to the relay optical system so that the image sensor acquires video of the optical image of the field of view with the adjustable reticle; and relaying the optical image of the field of view of the front end optical system to an image sensor using the relay optical system in the display-view configuration.

20. The method of claim 19 further comprising, in the display-view configuration, providing an optical path from the display through the eyepiece optical system using the optical redirection element to provide a view of video acquired with the image sensor comprising the real image of the field of view with the adjustable reticle.

21. The method of claim 19 further comprising receiving optical signals through a non-contact optical connector configured to couple optical signals between an attached module and the sight system.

22. The method of claim 19 further comprising receiving electrical signals through an electrical connector configured to couple electrical signals between an attached module and the sight system.

23. The method of claim 19, wherein the image sensor is configured to acquire infrared light.

24. The method of claim 23, wherein the image sensor is a focal plane array.

25. The method of claim 19, wherein the image sensor is configured to acquire visible light.

* * * * *